United States Patent [19]

Den Hartog et al.

[11] Patent Number: 4,988,759

[45] Date of Patent: * Jan. 29, 1991

[54] COATING COMPOSITION OF ACRYLIC POLYMERS CONTAINING REACTIVE GROUPS AND AN EPOXY ORGANOSILANE

[75] Inventors: Herman C. Den Hartog, Rochester; George T. Palmer, Troy, both of Mich.; Ara G. Yeramyan, Media, Pa.

[73] Assignee: E. I. Du Pont de Nemours and Company, Wilmington, Del.

[*] Notice: The portion of the term of this patent subsequent to Jan. 22, 2008 has been disclaimed.

[21] Appl. No.: 412,982

[22] Filed: Sep. 26, 1989

[51] Int. Cl.$^5$ ............................................. C08L 37/00
[52] U.S. Cl. .................................. 524/517; 524/501; 524/547; 524/531; 524/264
[58] Field of Search ............... 524/517, 531, 547, 507, 524/261, 264

[56] References Cited

U.S. PATENT DOCUMENTS

| | | | |
|---|---|---|---|
| Re. 32,272 | 10/1986 | Funaki et al. | |
| 3,437,512 | 4/1969 | Burlant et al. | 117/93.31 |
| 3,437,513 | 4/1969 | Burlant et al. | 117/93.31 |
| 3,555,051 | 1/1971 | Marsden et al. | 260/348 |
| 3,650,813 | 3/1972 | Nordstrom et al. | 117/93.31 |
| 3,666,539 | 5/1972 | Kiel | 117/124 F |
| 3,785,946 | 1/1974 | Terai et al. | 204/181 |
| 3,904,587 | 9/1975 | Tanaka et al. | 260/77.5 BB |
| 3,935,349 | 1/1976 | Terai et al. | 427/409 |
| 4,032,487 | 6/1977 | Columbus | 260/17 R |
| 4,043,953 | 8/1977 | Chang et al. | 260/18 S |
| 4,087,585 | 5/1978 | Schulz | 428/429 |
| 4,093,673 | 6/1978 | Chang et al. | 260/824 EP |
| 4,097,643 | 6/1978 | Hasegawa | 428/270 |
| 4,107,228 | 8/1978 | Horowitz et al. | |
| 4,181,766 | 1/1980 | Williams et al. | |
| 4,276,135 | 6/1981 | Sato et al. | 204/159.13 |
| 4,310,640 | 1/1982 | Kato et al. | |
| 4,396,678 | 8/1983 | Olson | |
| 4,398,007 | 8/1983 | Kubota et al. | |
| 4,399,261 | 8/1983 | Kato et al. | 525/342 |
| 4,401,537 | 8/1983 | Olson | |
| 4,431,472 | 2/1984 | Hohl et al. | 156/307 |
| 4,439,494 | 3/1984 | Olson | |
| 4,446,259 | 5/1984 | Vasta | 523/408 |
| 4,522,966 | 6/1985 | Funaki et al. | 524/114 |
| 4,525,521 | 6/1985 | DenHartog et al. | 524/517 |
| 4,558,082 | 12/1985 | Eckberg | 524/104 |
| 4,564,557 | 1/1986 | Ohgushi et al. | 428/333 |
| 4,581,383 | 4/1986 | Park | 521/91 |
| 4,584,245 | 4/1986 | Kuga | 428/409 |
| 4,594,379 | 6/1986 | Funaki et al. | 524/114 |
| 4,614,766 | 9/1986 | Schimmel et al. | 525/104 |
| 4,622,369 | 11/1986 | Chang et al. | 525/440 |
| 4,623,676 | 11/1986 | Kistner | 522/15 |
| 4,623,697 | 11/1986 | Chang et al. | 525/61 |
| 4,640,967 | 2/1987 | Eckburg | |
| 4,663,185 | 5/1987 | Eckberg | 427/54.1 |
| 4,668,601 | 5/1987 | Kistner | 430/162 |
| 4,684,697 | 8/1987 | Chang et al. | 525/100 |
| 4,755,565 | 7/1988 | Snow | 525/327.3 |

FOREIGN PATENT DOCUMENTS

| | | |
|---|---|---|
| 175134 | 9/1984 | European Pat. Off. |
| 173278 | 3/1986 | European Pat. Off. |
| 193643 | 9/1986 | European Pat. Off. |
| 205827 | 12/1986 | European Pat. Off. |
| 3607071 | 9/1986 | Fed. Rep. of Germany |
| 3615790 | 11/1986 | Fed. Rep. of Germany |
| 3602490 | 8/1987 | Fed. Rep. of Germany |
| 51-054644 | 5/1976 | Japan |
| 54-081400 | 6/1979 | Japan |
| 57-058125 | 4/1982 | Japan |
| 60-051753 | 3/1985 | Japan |
| 61-060764 | 3/1986 | Japan |
| 61-118414 | 6/1986 | Japan |
| 61-118415 | 6/1986 | Japan |
| 61-120879 | 6/1986 | Japan |
| 61-162563 | 7/1986 | Japan |
| 61-185573 | 8/1986 | Japan |
| 62-001764 | 1/1987 | Japan |
| 62-032156 | 2/1987 | Japan |
| 62-153359 | 7/1987 | Japan |
| 62-235361 | 10/1987 | Japan |
| 62-236821 | 10/1987 | Japan |
| 62-252473 | 11/1987 | Japan |
| 62-253670 | 11/1987 | Japan |
| 62-253671 | 11/1987 | Japan |
| 62-253676 | 11/1987 | Japan |

Primary Examiner—Joseph L. Schofer
Assistant Examiner—Jeffrey T. Smith
Attorney, Agent, or Firm—Hilmar L. Fricke

[57] ABSTRACT

A coating composition which cures at ambient temperatures and contains 20–80% by weight of a binder and 80–20% by weight of a solvent for the binder, wherein the binder contains about:

A. an acrylic polymer A of polymerized monomers of methyl methacrylate and monomers of styrene, alkyl methacrylate and/or alkyl acrylate each having 2–12 carbon atoms in the alkyl group and said polymer having pending from the polymer backbone aminoester groups, hydroxy aminoester groups or hydroxyamine groups, B. an acrylic crosslinking polymer B of polymerized monomers of at least 3% by weight, based on the weight of the crosslinking polymer, of a glycidyl constituent of glycidyl methacrylate or acrylate and the remainder of the monomers are alkyl methacrylate an acrylate each having 1–12 carbon atoms in the alkyl group and optionally contains at least 3% by weight, based on the weight of the crosslinking polymer, of an alkyl methacrylate or acrylate having a pendent group of the formula

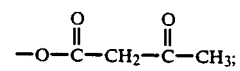

C. an organosilane compound having an epoxy group;

the composition is useful as an exterior finish for automobiles and trucks and for repairing and finishes of automobiles and trucks.

15 Claims, No Drawings

COATING COMPOSITION OF ACRYLIC POLYMERS CONTAINING REACTIVE GROUPS AND AN EPOXY ORGANOSILANE

BACKGROUND OF THE INVENTION

This invention is related to a coating composition and in particular to a coating composition that cures rapidly at ambient temperatures to form a finish with improved initial properties such as moisture resistance and tape marking resistance.

There are a number of coating compositions available for finishing and repairing of the exterior finish of automobiles and trucks. These compositions cure at ambient temperatures and provide finishes with good physical properties such as gloss, hardness, weatherability, good adhesion, chip resistance and the like. Typical useful compositions are shown in Den Hartog et al U.S. Pat. No. 4,525,521 issued June 25, 1985; however, it would be very desirable if these compositions would have a faster initial curing rate without a sacrifice of any of the other very acceptable properties of the compositions. Other useful compositions which contain isocyanates are shown in Crawley et al U.S. Pat. No. 4,131,571 issued Dec. 26, 1978, Miller U.S. Pat. No. 4,020,216 issued Apr. 26, 1977, Miller U.S. Pat. No. 3,844,993 issued Oct. 29, 1974, Miller U.S. Pat. No. 3,789,037 issued Jan. 29, 1974 and Vasta U.S. Pat. No. 3,558,564 issued Jan. 26, 1971. It would be desirable to provide an ambient temperature curing composition that has a rapid initial curing rate along with an acceptable "pot life" that forms an automotive quality finish on curing and does not contain an isocyanate compound.

The novel composition of this invention has a rapid initial cure rate, i.e., crosslinks quickly at ambient temperatures to provide excellent initial properties such as moisture and tape marking resistance, has an acceptable pot life, forms a finish that has acceptable flexiblity and outdoor durability and has the other properties that are necessary for exterior finishes for automobiles and trucks and does not contain an isocyanate compound.

SUMMARY OF THE INVENTION

A coating composition containing about 20–80% by weight of a binder and 80–20% by weight of a solvent for the binder, wherein the binder contains about:

A. 40–78% by weight, based on the weight of the binder, of an acrylic polymer A of polymerized monomers of methyl methacrylate and monomers selected from the group of styrene, alkyl methacrylate and alkyl acrylate each having 2–12 carbon atoms in the alkyl group and the polymer has pending from the carbon-carbon atoms of the polymer backbone aminoester groups of the formula

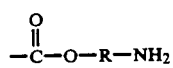

where R is an alkylene group having 2–3 carbon atoms; or hydroxy aminoester groups of the formula

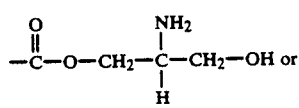

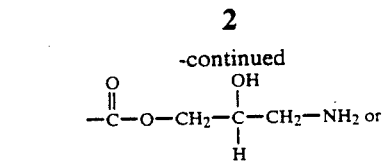

groups of the formula

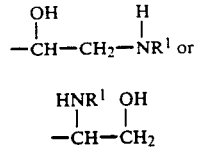

where $R^1$ is an alkyl group of 1–8 carbon atoms; and

B. 20–40% by weight, based on the weight of the binder, of an acrylic crosslinking polymer B of polymerized monomers of at least 3% by weight, based on the weight of the crosslinking polymer, of a glycidyl constituent selected from the group of glycidyl methacrylate and glycidyl acrylate, and the remainder of the monomers are selected from the group of alkyl methacrylate and alkyl acrylate each having 1–12 carbon atoms in the alkyl group and optionally contains at least 3% by weight, based on the weight of the crosslinking polymer, of an alkyl acrylate or methacrylate having a pendent group of the formula

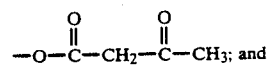

C. 2–40% by weight, based on the weight of the binder, of an organosilane compound containing an epoxy group;

wherein polymers A and B each have a weight average molecular weight of about 5,000–40,000 determined by gel permeation chromatography using polymethyl methacrylate as a standard.

DETAILED DESCRIPTION OF THE INVENTION

The coating composition contains about 20–80% by weight of a film forming binder and 80–20% by weight of solvent for the binder. The binder is a blend of about 40–78% by weight of acrylic polymer A, 20–40% of acrylic crosslinking polymer B and 2–40% by weight of and organosilane compound having an expoxy group. The composition can be used as a clear finish without pigments or only lightly pigmented while retaining its clear characteristics or can be pigmented and used as a conventional monofinish or as the color coat of a color coat/clear coat finish. Typically, a pigment to binder weight ratio of about 1:100 to 200:100 can be used.

Both acrylic polymer A and acrylic crosslinking polymer B have a weight average molecular weight of about 5,000–40,000 and a number average molecular weight of about 2,000–15,000. Molecular weight is determined by gel permeation chromatography using polymethyl methacrylate as the standard.

One method for preparing the acrylic polymer A is to polymerize monomers of methyl methacrylate, alkyl methacrylate, alkyl acrylate or mixtures thereof, each having 2–12 carbon atoms in the alkyl group, and methacrylic acid or acrylic acid. Styrene also can be used in amounts of about 50% by weight of the polymer. The carboxyl groups of the resulting polymer are reacted with an alkylene imine preferably in a molar ratio of about 1:1 to form pendent amino ester groups from the backbone of the polymer.

The polymerization of the monomers to form the acrylic polymer A is carried out by conventional techniques in which the monomers, solvents and polymerization catalysts are charged into a polymerization vessel and reacted at about 50°–175° C. for about 0.5–6 hours to form the polymer.

Typical solvents used are toluene, xylene, ethyl acetate, acetone, methyl ethyl ketone, methyl isobutyl ketone, ethanol, isopropanol and other aliphatic, cycloaliphatic and aromatic hydrocarbon esters, ethers, ketones and alcohols as are conventionally used.

One preferred acrylic polymer contains about 20–30% by weight methyl methacrylate, 25–35% by weight of an alkyl methacrylate having 4–12 carbon atoms in the alkyl group such as butyl methacrylate, 30–40% styrene and 10–15% by weight methacrylic acid. The carboxyl groups of the polymer are post reacted with an alkylene imine such as propylene imine, preferably in a 1:1 molar ratio, to a provide amino ester groups pendent from the carbon-carbon polymer backbone of the formula

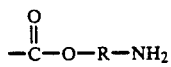

where R is an alkylene group having 2–3 carbon atoms.

Other useful acrylic polymers are the aformentioned acrylic polymers except that the aminoester group is replaced by hydroxy aminoester groups of the formula

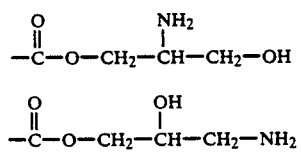

Such polymers are disclosed in DenHartog et al. U.S. Pat. No. 4,525,521 issued June 25, 1985 which is hereby incorporated by reference.

Another useful type of acrylic polymer are the aforementioned acrylic polymers except that the aminoester group is replaced with groups of the formula

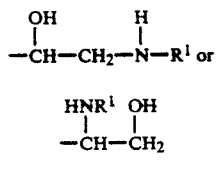

where $R^1$ is an alkyl group of 1–8 carbon atoms. Such polymers are disclosed in Snow U.S. Pat. No. 4,785,054 issued Nov. 15, 1988 which is hereby incorporated by reference.

The acrylic crosslinking polymer B is composed of polymerized monomers of at least 3% by weight of a glycidyl constituent which is either glycidyl methacrylate or glycidyl acrylate and the remainder of the monomers are alkyl methacrylate, alkyl acrylate or mixtures thereof where the alkyl group contains 1–12 carbon atoms and optionally contains at least 3% by weight of an alkyl methacrylate or acrylate having 1–4 carbon atoms in the alkyl group and pendent groups of the formula

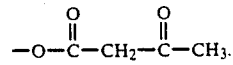

Useful acrylic crosslinking polymers are composed of polymerized monomers of about 3–80% by weight, based on the weight of the polymer, of glycidyl methacrylate or acrylate, 20–97% by weight, based on the weight of the polymer of an alkyl methacrylate having 1–12 carbon atoms, preferably 4–12 carbon atoms, in the alkyl group such as butyl methacrylate.

Other useful acrylic crosslinking polymers are composed of polymerized monomers of about 3–80% by weight, based on the weight of the polymer, of glycidyl methacrylate or acrylate, 15–40% by weight, based on the weight of the polymer, of an alkyl methacrylate having 1–12 carbon atoms, preferably 4–12 carbon atoms, in the alkyl group such as butyl methacrylate and 3–57% by weight, based on the weight of the polymer, of acetoacetoxy ethyl methacrylate or acrylate.

The following are an examples of preferred acrylic crosslinking polymers: 60% glycidyl methacrylate/40% butyl methacrylate, 45% glycidyl methacrylate/40% butyl methacrylate/15% acetoacetoxy ethyl methacrylate, 50% glycidyl methacrylate/40% butyl methacrylate/10% acetoacetoxy ethyl methacrylate, 55% glycidyl methacrylate/40% butyl methacrylate/5% acetoacetoxy ethyl methacrylate.

Other useful crosslinking polymers are as follows 30% glycidyl methacrylate/40% butyl methacrylate/30% acetoacetoxy ethyl methacrylate, 3% glycidyl methacrylate/40% butyl methacrylate/57% acetoacetoxy ethyl methacrylate.

The aforementioned percentages are weight percentages.

Acetoacetoxy ethyl methacrylate or acrylate are typically useful and preferred monomers that contain the aforementioned pendent group of the crosslinking polymer.

The pendent group of the crosslinking polymer can also be formed by preparing a hydroxyl containing acrylic polymer and reacting the hydroxyl groups of the polymer with a diketene or with an alkylate of acetoacetic acid such as methyl acetoacetate or t-butyl acetoacetate. A blocked ketene such as 2,2,6, trimethyl-4H-1,3 dioxin-4-one may also be used.

It was found that when a crosslinking polymer was used that contained the aforemened pendent group and was combined with an epoxy functional organosilane compound, finishes were formed that cured more rapidly and had improved solvent resistance in comparison to finishes formed with crosslinking polymers that did not contain the pendent group.

Typical alkyl methacrylate and alkyl acrylate monomers that are used to prepare the aforementioned polymers are ethyl methacrylate, propyl methacrylate, butyl methacrylate, isobutyl methacrylate, pentyl methacrylate, hexyl methacrylate, ethyl hexyl methacrylate, nonyl methacrylate, decyl methacrylate, lauryl methacrylate, ethyl acrylate, propyl acrylate, butyl acrylate, isobutyl acrylate, pentyl acrylate, hexyl acrylate, ethyl hexyl acrylate, nonyl acrylate, decyl acrylate, lauryl acrylate and the like.

The organo silane compound containing an epoxy group is represented by the formula:

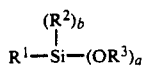

wherein $R^1$ is an organic group having an epoxy group, $R^2$ is hydrogen, a hydrocarbon group having 1-6 carbon atoms b is an integer of 0-2, $R^3$ is a hydrocarbon group having 1-5 carbon atoms or an alkoxyalkyl group, a is an integer of 1-3. Typical silanes are as follows:
glycidoxymethyl trimethoxysilane,
glycidoxymethyl triethoxysilane,
glycidoxyethyl triethoxysilane,
glycidoxypropyl trimethoxysilane,
glycidoxypropyl triethoxysilane,
glycidoxypropyl tri(methoxyethoxy)silane,
glycidoxypropyl triacetoxysilane,
glycidoxybutyl trimethoxysilane,
glycidoxymethyl dimethoxysilane,
glydidoxymethyl(ethyl)dimethoxysilane,
glycidoxymethyl(dimethyl)methoxysilane,
glycidoxyethyl(ethyl)dimethoxysilane,
glycidoxypropyl(ethyl)dimethoxysilane,
glycidoxybutyl(methyl)dimethoxysilane,
glycidylmethyl trimethoxysilane,
glycidylmethyl triethoxysilane,
glycidylethyl triethoxysilane,
glycidylpropyl triethoxysilane,
glycicylbutyl triethoxysilane,
3,4-epoxycyclohexylmethyl trimethoxysilane,
3,4-epoxycyclohexylethyl trimethoxysilane,
3,4-epoxycyclohexylpropyl trimethoxysilane,
3,4-epoxycyclohexylbutyl trimethoxysilane.

Preferred silanes are glycidoxypropyl trimethoxysilane and beta-(3,4-epoxycyclohexyl)ethyl trimethoxysilane since these silanes form finishes of excellent quality, durability and weatherability.

About 0.1-4% by weight, based on the weight of the binder, of a catalyst can be added to the coating composition. Typical catalysts are resorcinol, resorcinol monobenzoate, boron trifluoride amine complex, phenol, para methoxy phenol, parahydroxy methyl benzoate, hydroquinone, and alkyl metal laurate catalysts such as dibutyl tin dilaurate and the like. A metal laurate catalyst can be combined with one of the other catalysts to further enhance cure rate.

As mentioned before, the composition can contain pigments. These pigments can be introduced into the composition by first forming a mill base with acrylic polymer A utilized in the composition or with other compatible polymers or polymer dispersants by conventional techniques, such as sand-grinding, ball milling, attritor grinding, two roll milling to disperse the pigments. The mill base is blended with the film-forming constituents as shown in the following Examples.

Any of the conventional pigments used in coating compositions can be utilized in the composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons, pearlescent pigments and other organic pigments and dyes.

To improve weatherability of finishes of the coating composition about 0.1-5%, by weight, based on the weight of the binder, of an ultraviolet light stabilizer or a combination of ultraviolet light stabilizers can be added. Typically useful ultra-violet light stabilizers are disclosed hereinafter.

The coating composition of this invention can be applied over a variety of substrates, such as metal, glass, plastic, reinforced plastic and the like, by any of the conventional application methods, such as spraying, electro-static spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are usually dried at ambient temperatures and are tack free after about 1-4 hours and fully cured after about 4-7 days. The coatings can be baked at relatively low temperatures of about 65°-140° C. for about 15 minutes-2 hours. The resulting coating is about 0.1-5 mils thick but for most uses, a 1-3 mil thick coating is used. One technique that is used to insure that there will be no popping or cratering of the coating is to allow the solvents to flash off for at least 2 minutes before a second coating is sprayed on or otherwise applied, then waiting about 2-10 minutes before baking the coating to allow any residual solvents to flash off if the coating is to be baked. The resulting coating has good gloss and can be rubbed or polished with conventional techniques to improve the smoothness, appearance and gloss. The coating has good adhesion to substrates of all types, is hard and resistant to weathering, solvents, alkali, scratches and the like. These characteristics make the composition particularly useful as a finish for automobiles, trucks, airplanes, railroad equipment and for the repair of finishes of trucks and automobiles.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention and contains pigments in a pigment-to-binder ratio of about 1/100 to 150/100 and other additives. Other compatible color coats can be used with the clear coating composition of this invention.

The thickness of the fully cured color coat and clear coat can vary. Generally, the color coat is about 0.4-1.5 mils thick and preferably 0.6-1.0 mils thick and the clear coat is about 0.5-6.0 mils thick and preferably 0.8-2.0 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015-50 microns. Typical pigments that can be used in a pigment-to-binder weight ratio of about 1/100 to 10/100 are inorganic siliceous pigments, such as silica pigments. These pigments have a refractive index of about 1.4-1.6.

To form a durable finish, the clear coat and optionally, the color coat contain about 0.1-5% by weight based on the weight of the binder, of an ultraviolet light stabilizer. Typical ultraviolet light stabilizers that are useful are as follows:

Benzophenones such as hydroxy dodecyloxy benzophenone, 2,4 dihydroxybenzophenone, hydroxybenzophenones containing sulfonic groups and the like.

Triazoles such as 2-phenyl-4-(2',4'-dihydryoxylbenzoyl)-triazoles, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis(2'-hydroxybenzoyl)benzene, metal derivatives of 3,5-di-t-butyl-4-hydroxy phenyl propianic acid, asymmetrical oxalic acid, diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

One preferred combination of ultraviolet light stabilizer is a benzotriazole and a hindered amine light stabilizer and is preferably used in a weight ratio of about 1:1. The combination is used in an amount of about 1-4% by weight, based on the weight of the binder. One preferred benzotriazole is "Tinuvin" 328,2-(2 hydroxy-3,5-ditertiary amyl-phenol)-2H-benzotriazole and a preferred hindered amine is "Tinuvin" 292, bis(1,2,2,6,6-pentamethyl-4 piperidinyl)sebacate. Another preferred hindered amine is "Tinuvin" 770, di[4(2,2,6,6 tetramethyl piperdinyl)]sebacate.

The clear coat/color coat finish is applied by conventional spraying techniques and preferably the clear coat is applied to the color coat while the color coat is still wet. Other conventional application techniques can be used such as brushing, roller coating, electrostatic spraying the the like. The finish is then dried at ambient temperatures or can be used as indicated above.

The following Examples illustrate the invention. All parts and percentages are on a weight basis unless otherwise indicated. Molecular weights are determined by gel permeation chromatography using polymethyl methacrylate as the standard.

EXAMPLE 1

Acrylic polymer A solution was prepared by charging the following constituents into a reaction vessel equipped with a heating mantle, reflux condenser, thermometer and stirrer:

|  | Parts by Weight |
| --- | --- |
| Portion 1 | |
| Butyl acetate | 959.53 |
| Toluene | 367.08 |
| Isopropanol | 641.24 |
| Butyl Methacrylate monomer (BMA) | 127.22 |
| Portion 2 | |
| Butyl methacrylate monomer | 817.23 |
| Methyl methacrylate monomer (MMA) | 755.55 |
| Styrene monomer (S) | 1066.42 |
| Methacrylic acid monomer (MAA) | 329.93 |
| Portion 3 | |
| 2,2'-Azobis(methylbutyronitrile) | 97.58 |
| Toluene | 295.06 |

|  | Parts by Weight |
| --- | --- |
| Portion 4 | |
| Methacrylic acid monomer | 48.81 |
| Toluene | 148.69 |
| Portion 5 | |
| 2,2'-Azobis(methylbutyronitrile) | 1.17 |
| Toluene | 12.77 |
| Portion 6 | |
| Butyl acetate | 2160.71 |
| Portion 7 | |
| Propylene imine | 251.01 |
| Total | 8080.00 |

Portion 1 is charged into the reaction vessel and mixed and the resulting mixture is heated to its reflux temperature of about 90 C. Portion 2 is premixed and slowly added at a uniform rate over a 90 minute period to the reaction vessel while maintaining the mixture at its reflux temperature. Portion 3 is premixed and fed into the reaction vessel simultaneously with Portion 2 over the same time period. Immediately after Portions 2 and 3 have been added Portion 4 is added over a 45 minute period while holding the reaction mixture at its reflux temperature and then holding the reaction mixture at its reflux temperature for an additional 30 minutes. Portion 5 is added and then the reaction mixture is held at its reflux temperature for 45 minutes. Portion 6 is added and the reaction mixture is cooled to 60 C. and then Portion 7 is added and the reaction mixture is heated to its reflux temperature and held at this temperature until and acid no. of 2 is reached.

The resulting polymer solution has a polymer weight solids content of about 42%, a Gardner Holdt viscosity at 25 C. of about C +½ to D +½. The polymer has a composition of about 24% methyl methacrylate, 30% butyl methacrylate, 34% styrene and 12% methacrylic acid postiminated with propylene imine. The resulting polymer has an acid no. of about 2, a number average molecular weight of about 6,800 and a weight average molecular weight of about 10,600.

Crosslinking polymer solution 1 was prepared by charging the following constituents into a reaction vessel described above:

|  | Parts by Weight |
| --- | --- |
| Portion 1 | |
| Butyl acetate | 745.00 |
| Toluene | 128.00 |
| Ethyl acetate | 207.00 |
| Portion 2 | |
| Glycidyl methacrylate monomer | 1166.00 |
| Butyl methacrylate monomer | 777.00 |
| Butyl acetate | 280.00 |
| 2,2'-Azobis(methylbutyronitrile) | 93.00 |
| Portion 3 | |
| Butyl acetate | 72.00 |
| 2,2'-Azobis(methylbutyronitrile) | 24.00 |
| Portion 4 | |
| Butyl acetate | 510.00 |
| Propylene glycol monomethyl acetate | 242.00 |
| Total | 4244.00 |

Portion 1 was charged into the reaction vessel and heated to its reflux temperature of about 110°-112° C. Portion 2 was premixed and added at a uniform rate over a 2 hour period while maintaining the reaction mixture at its reflux temperature Immediately after portion 2 was completely added, Portion 3 was added over a 30 minute period and then the reaction mixture was held at its reflux temperature for an additional 30 minutes. Portion 4 was added and the reaction mixture was cooled to room temperature.

The resulting polymer solution had a polymer solids of about 46%, and a relative viscosity of about 1.037–1.039. The composition of the polymers is 40% butyl methacrylate, and 60% glycidyl methacrylate and had a number average molecular weight of about 2,410 and a weight average molecular weight of about 5,250.

A Clear Polymer Solution was prepared by blending the following constituents:

|  | Parts by Weight |
|---|---|
| Acrylic polymers A solution (prepared above) | 456.51 |
| Isopropanol | 9.86 |
| Propylene glycol monoethyl ether acetate | 31.86 |
| Hydrocarbon solvent | 10.50 |
| Mineral spirits (aromatic controlled) | 10.61 |
| UV Stabilizer ("Tinuvin" 328) | 2.72 |
| HALS light stabilizer ("Tinuvin" 292) | 2.72 |
| Flow control agent ("Acrylon" MFPF from Synthron) | 0.39 |
| Slip agent (BYK 325) | 0.53 |
| Non-Aqueous Dispersion Rheology Control Agent | 12.85 |
| Total | 538.55 |

A Thinner Solution was prepared by blending the following constituents:

|  | Parts by Weight |
|---|---|
| Propylene glycol monoethyl ether acetate | 30.78 |
| Hydrocarbon solvent | 26.69 |
| Ethyl 3-ethoxy propionate | 59.56 |
| Butyl Cellosolve Acetate | 1.12 |
| Catalyst solution (p-hydroxymethyl benzoate) | 7.74 |
| Total | 125.89 |

A silane solution was prepared by blending together the following constituents:

|  | Parts by Weight |
|---|---|
| Glycidoxypropyl trimethoxysilane | 90.91 |
| Dibutyltin dilaurate | 9.09 |
| Total | 100.00 |

Clear coating compositions 1–3 were formulated as follows. Clear coating composition 1 does not contain silane and is considered the control. Clear coating compositions 2 and 3 each contained respectively 10% and 20% by weight, based on the weight of the binder of the composition, of silane.

Clear coating composition 1 was prepared by blending the following constituents together:

|  | Parts by Weight |
|---|---|
| Clear Polymer Solution (prepared above) | 67.38 |
| Thinner Solution (prepared above) | 15.78 |
| Crosslinker Polymer Solution 1 (prepared above) | 16.84 |
| Total | 100.00 |

Clear coating composition 2 was prepared by blending the following constituents together:

|  | Parts by Weight |
|---|---|
| Clear Polymer Solution (prepared above) | 65.08 |
| Thinner Solution (prepared above) | 15.24 |
| Crosslinker Polymer Solution 1 (prepared above) | 16.26 |
| Silane solution (prepared above) | 3.42 |
| Total | 100.00 |

Clear coating composition 3 was prepared by blending the following constituents together:

|  | Parts by Weight |
|---|---|
| Clear Polymer Solution (prepared above) | 62.92 |
| Thinner Solution (prepared above) | 14.74 |
| Crosslinker Polymer Solution 1 (prepared above) | 15.73 |
| Silane solution (prepared above) | 6.61 |
| Total | 100.00 |

Clear coating compositions 1,2 and 3 were sprayed onto separate primed steel panels coated with an acrylic lacquer pigmented finish and then cured at room temperature. In each case, the resulting clear finish was about 2 mils thick. Each panel was tested for tape print resistance and for water spot resistance.

In the tape print resistance test masking tape was applied every 4 hours during a period of 8–24 hours after application of the finish The tape was removed one hour after it was applied and then 1 hour after the tape was removed, the finish was inspected for printing resulting from the tape. The time at which no printing from the tape was noted is shown below.

In the water spot resistance test, three drops of distilled waster were applied every 4 hours after application of the finish and the water was allowed to evaporate. After the water evaporated the panel was inspected for distortion of the finish. The time at which no distortion from water was noted is shown below.

| Test | Tape Print Resistance (1) | Water Spot Resistance (2) |
|---|---|---|
| Coating Comp. 1 (control) | 16 hours | 20 hours |
| Coating Comp. 2 (10% silane) | 8 hours | 8 hours |
| Coating Comp. 3 (20% silane) | 8 hours | 8 hours |

(1) Time in hours when tape did not imprint finish.
(2) Time in hours when water did not spot finish.

Other properties of the each of the finishes were tested such as gloss, distinctness of image, durability, chemical resistance and adhesion after 168 hours of curing at room temperature and were acceptable for an automotive quality finish.

EXAMPLE 2

Crosslinking polymer solution 2 was prepared by charging the following constituents into a reaction vessel described above:

|  | Parts by Weight |
|---|---|
| Portion 1 | |
| Butyl acetate | 745.00 |
| Toluene | 128.00 |
| Ethyl acetate | 207.00 |

-continued

| | Parts by Weight |
|---|---|
| Portion 2 | |
| Glycidyl methacrylate monomer | 875.00 |
| Butyl methacrylate monomer | 777.00 |
| Acetoacetoxy ethyl methacrylate monomer | 291.00 |
| Butyl acetate | 280.00 |
| 2,2'-Azobis(methylbutyronitrile) | 93.00 |
| Portion 3 | |
| Butyl acetate | 72.00 |
| 2,2'-Azobis(methylbutyronitrile) | 24.00 |
| Portion 4 | |
| Butyl acetate | 510.00 |
| Propylene glycol monomethyl acetate | 242.00 |
| Total | 4244.00 |

Portion 1 was charged into the reaction vessel and heated to its reflux temperature of about 110–112. Portion 2 was premixed and added at a uniform rate over a 2 hour period while maintaining the reaction mixture at its reflux temperature. Immediately after portion 2 was completely added, Portion 3 was added over a 30 minute period and then the reaction mixture was held at its reflux temperature for an additional 30 minutes. Portion 4 was added and the reaction mixture was cooled to room temperature.

The resulting polymer solution had a polymer solids of about 46%. and a relative viscosity of about 1.037–1.039. The composition of the polymers is 40% butyl methacrylate, 60% glycidyl methacrylate and 15% acetoacetoxy ethyl methacrylate and had a number average molecular weight of about 1,976 and a weight average molecular weight of about 5,303.

Clear coating compositions 4 and 5 were prepared using the same constituents and amounts as in Example 1 except Crosslinking Polymer Solution 2 (prepared above) was substituted for Crosslinking Polymer Solution 1. Clear coating compositions 1, 4 and 5 each were sprayed onto separate primed steel panels coated with an acrylic lacquer pigmented basecoat finish and then cured at room temperature. In each case, the resulting clear finish was about 2 mils thick. Each panel was tested for rerepair lift.

Rerepair lift is tested by sanding through an area of the coating to the substrate below the basecoat and lifting is checked at specified times after the panels were sprayed. The panels were sanded in such a way to produce a smooth feather-edge. These panels were then resprayed to hiding with the above basecoat. A 0–5 rating scale is used to describe the lift; 0 represents no lift and 5 represents severe lifting over both sanded and unsanded areas of the panel. The data is shown below.

| | 1 Day | 4 Days | 7 Days | 14 Days |
|---|---|---|---|---|
| Coating comp. 1 (control) | 2 | 3 | 2 | 1 |
| Coating comp. 4 (10% silane) | 1 | 1 | 0 | 0 |
| Coating comp. 4 (20% silane) | 1 | 0 | 0 | 0 |

Other properties of the each of the finishes were tested such as gloss, distinctness of image, durability, chemical resistance and adhesion after 168 hours of curing and were acceptable for an automotive quality finish.

We claim:

1. A coating composition comprising 20–80% by weight of a binder and 80–20% by weight of a solvent for the binder, wherein the binder consists essentially of about:

A. 40–78% by weight, based on the weight of the binder, of an acrylic polymer A consisting essentially of polymerized monomers of methyl methacrylate and monomers selected from the group consisting of styrene, alkyl methacrylate and alkyl acrylate each having 2–12 carbon atoms in the alkyl group and said polymer having pending from the carbon-carbon atoms of the polymer backbone reactive groups selected from the group consisting of aminoester groups of the formula

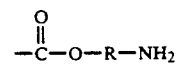

where R is an alkylene group having 2–3 carbon atoms, hydroxyamino ester groups of the formula

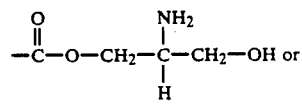

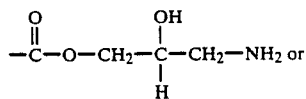

groups of the formula

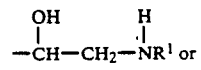

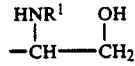

where $R^1$ is an alkyl group of 1–8 carbon atoms; and

B. 20–40% by weight, based on the weight of the binder, of an acrylic crosslinking polymer B consisting essentially of polymerized monomers of at least 3% by weight, based on the weight of the crosslinking polymer, of a glycidyl constituent selected from the group consisting of glycidyl methacrylate and glycidyl acrylate, and the remainder of the monomers being selected from the group consisting of alkyl methacrylate and alkyl acrylate each having 1–12 carbon atoms in the alkyl groups and contains at least 3% by weight, based on the weight of the crosslinking polymer, of an alkyl acrylate or methacrylate having a pendent group of the formula

C. 2–40% by weight, based on the weight of the binder, of an organosilane compound of the formula

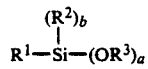

wherein R¹ is an organic group having an epoxy group, R² is hydrogen, a hydrocarbon group having 1-6 carbon atoms b is an integer of 0-2, R³ is a hydrocarbon group having 1-5 carbon atoms or an alkoxyalkyl group, a is an integer of 1-3; wherein said polymers A and B each have a weight average molecular weight of about 5,000-40,000 determined by gel permeation chromatography using polymethyl methacrylate as a standard.

2. The coating composition of claim 1 containing pigments in a pigment-to-binder weight ratio of 1:100 to 200:100.

3. The coating composition of claim 1 wherein the organosilane is selected from the group consisting of glycidoxypropyl trimethoxysilane and beta-(3,4-epoxy cyclohexyl)ethyl trimethoxysilane.

4. The coating composition of claim 1 in which the acrylic polymer A consists essentially of polymerized monomers of methyl methacrylate and monomers selected from the group consisting of styrene, alkyl methacrylate and alkyl acrylate each having 2-12 carbon atoms in the alkyl group and said polymer having pending from the carbon-carbon atoms of the polymer backbone reactive aminoester groups of the formula

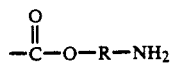

where R is an alkylene group having 2-3 carbon atoms.

5. The coating composition of claim 4 in which the acrylic polymer A consists essentially of about 20-30% by weight, based on the acrylic polymer, of methyl methacrylate 30-40% by weight, based on the weight of the acrylic polymer, of styrene, 25-35% by weight, based on the weight of the acrylic polymer, of an alkyl methacrylate having 4-12 carbon atoms in the alkyl group and 10-15% by weight, based on the weight of the acrylic polymer, of methacrylic acid; said polymer reacted with an alkylene imine to provide said amino ester groups.

6. The coating composition of claim 1 in which the acrylic polymer A consists essentially of polymerized monomers of methyl methacrylate and monomers selected from the group consisting of styrene, alkyl methacrylate and alkyl acrylate, each having 2-12 carbon atoms in the alkyl group and said polymer having pending from the carbon-carbon atoms of the polymer backbone hydroxyamino ester groups of the formula

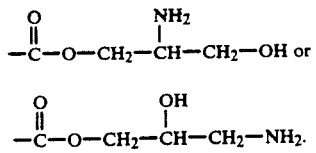

7. The coating composition of claim 1 in which the acrylic polymer A consists essentially of polymerized monomers of methyl methacrylate and monomers selected from the group consisting of styrene, alkyl methacrylate and alkyl acrylate, each having 2-12 carbon atoms in the alkyl group and said polymer having pending from the backbone groups of the formula

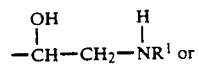

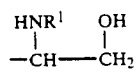

where R¹ is an alkyl group of 1-8 carbon atoms.

8. The coating composition of claim 1 in which the acrylic crosslinking polymer B consists essentially of about 3-80% by weight, based on the weight of the acrylic crosslinking polymer, of glycidyl methacrylate, or glycidyl acrylate and 20-97% by weight, based on the weight of the acrylic crosslinking polymer, of an alkyl methacrylate having 1-12 carbon atoms in the alkyl group.

9. The coating composition of claims 5, 6 or 7 in which the acrylic crosslinking polymer B consists essentially of about 3-80% by weight based on the weight of the acrylic crosslinking polymer, of glycidyl methacrylate, and 20-97% by weight, based on the weight of the acrylic crosslinking polymer, of an alkyl methacrylate having 4-12 carbon atoms in the alkyl group.

10. The coating composition of claim 1 in which the acrylic crosslinking polymer B consists essentially of about 3-80% by weight, based on the weight of the acrylic crosslinking polymer, of glycidyl methacrylate, or glycidyl acrylate and 15-40% by weight, based on the weight of the acrylic crosslinking polymer, of an alkyl methacrylate having 1-12 carbon atoms in the alkyl group and about 3-57% by weight, based on the weight of the acrylic crosslinking polymer of an alkyl methacrylate or alkyl acrylate each having 1-4 carbon atoms in the alkyl group and each having a pendent group of the formula

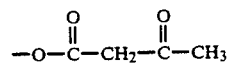

11. The coating composition of claims 5, 6 or 8 in which the acrylic crosslinking polymer B consists essentially of about 3-80% by weight, based on the weight of the acrylic crosslinking polymer, of glycidyl methacrylate, 15-40% by weight, based on the weight of the acrylic crosslinking polymer, of an alkyl methacrylate having 4-12 carbon atoms in the alkyl group and 3-57% by weight, based on the weight of the acrylic crosslinking polymer, of acetoacetoxy ethyl methacrylate.

12. The coating composition of claim 1 containing about 0.1-4% by weight, based on the weight of the binder, of a catalyst selected from the group consisting of resorcinol, resorcinol monobenzoate, boron trifuloride amine complex, phenol, para methoxy phenol, parahydroxymethyl benzoate or alkyl tin dilaurate.

13. The coating composition of claim 1 containing 0.1-5% by weight, based on the weight of the binder, of ultraviolet light stabilizer.

14. The coating composition of claim 2 in which the binder consists essentially of about
 A. acrylic polymer A consists essentially of about 20-30% by weight, based on the acrylic polymer of methyl methacrylate, 30-40% by weight, based on the weight of the acrylic polymer, of styrene, 25–35% by weight, based on the weight of the acrylic polymer, of alkyl methacrylate methacrylate having 4–12 carbon atoms in the alkyl group and 10–15% by weight, based on the weight of the acrylic polymer, of methacrylic acid; said polymer reacted with an alkylene imine to provide amino ester groups pendent from the carbon-carbon polymer backbone of the formula

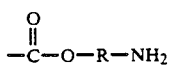

where R is an alkylene group having 2–3 carbon atoms; and

B. acrylic crosslinking polymer B consists essentially of about 3–80% by weight, based on the weight of the acrylic crosslinking polymer, of glycidyl methacrylate, and 20–97% by weight, based on the weight of the acrylic crosslinking polymer, of alkyl methacrylate having 4–12 carbons in the alkyl group;

C. an organosilane selected from the group consisting of glycidoxypropyl trimethoxysilane and beta-(3,4-epoxy cyclohexyl) ethyl trimethoxysilane.

15. The coating composition of claim 2 in which the binder consists essentially of about A. acrylic polymer A consists essentially of about 20–30% by weight, based on the acrylic polymer, of methyl methacrylate, 30–40% by weight, based on the weight of the acrylic polymer, of styrene, 25–35% by weight, based on the weight of the acrylic polymer, of alkyl methacrylate methacrylate having 4–12 carbon atoms in the alkyl group and 10–15% by weight, based on the weight of the acrylic polymer, of methacrylic acid; said polymer reacted with an alkylene imine to provide amino ester groups pendent from the carbon-carbon polymer backbone of the formula

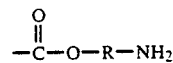

where R is an alkylene group having 2–3 carbon atoms; and

B. acrylic crosslinking polymer B consists essentially of about 3–80% by weight based on the weight of the acrylic crosslinking polymer, of glycidyl methacrylate, 15–40% by weight, based on the weight of the acrylic crosslinking polymer, of an alkyl methacrylate having 4–12 carbon atoms in the alkyl group and 3–57% by weight, based on the weight of the acrylic crosslinking polymer, of acetoacetoxy ethyl methacrylate.

C. an organosilane selected from the group consisting of glycidoxypropyl trimethoxysilane and beta-(3,4-epoxy cyclohexyl) ethyl trimethoxysilane.

* * * * *

UNITED STATES PATENT AND TRADEMARK OFFICE
CERTIFICATE OF CORRECTION

PATENT NO. : 4,988,759

DATED : January 29, 1991

INVENTOR(S) : Herman C. Den Hartog, George T. Palmer, Ara G. Yeramyan

It is certified that error appears in the above-identified patent and that said Letters Patent is hereby corrected as shown below:

Claim 11, Column 14, line 44, claim reference number "8" should be --7--.

Signed and Sealed this

Third Day of November, 1992

Attest:

DOUGLAS B. COMER

*Attesting Officer*  *Acting Commissioner of Patents and Trademarks*